United States Patent
Golan et al.

(10) Patent No.: US 10,944,778 B1
(45) Date of Patent: Mar. 9, 2021

(54) METHOD AND SYSTEM FOR IMPLEMENTING RISK BASED CYBER SECURITY

(71) Applicant: EMC IP Holding Company LLC, Hopkinton, MA (US)

(72) Inventors: Oron Golan, Meitar (IL); Assaf Natanzon, Tel Aviv (IL); Amit Lieberman, Raanana (IL); Yuri Manusov, Beer Sheva (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 379 days.

(21) Appl. No.: 15/795,967

(22) Filed: Oct. 27, 2017

(51) Int. Cl.
| | |
|---|---|
| *H04L 9/00* | (2006.01) |
| *H04L 29/06* | (2006.01) |
| *G06F 21/57* | (2013.01) |
| *G06F 21/56* | (2013.01) |
| *G06F 21/55* | (2013.01) |

(52) U.S. Cl.
CPC ........ *H04L 63/1433* (2013.01); *G06F 21/566* (2013.01); *G06F 21/577* (2013.01); *H04L 63/1416* (2013.01); *G06F 21/552* (2013.01); *G06F 21/554* (2013.01)

(58) Field of Classification Search
CPC .................................................. H04L 63/1433
USPC ........................................................ 726/25
See application file for complete search history.

(56) References Cited

U.S. PATENT DOCUMENTS

| | | | | |
|---|---|---|---|---|
| 7,437,764 | B1 * | 10/2008 | Sobel ................... | G06F 21/562 713/176 |
| 10,482,239 | B1 * | 11/2019 | Liu ...................... | H04L 63/0263 |
| 2018/0077188 | A1 * | 3/2018 | Mandyam ........... | H04L 63/1433 |
| 2018/0219901 | A1 * | 8/2018 | Gorodissky ........... | G06F 21/577 |
| 2018/0285567 | A1 * | 10/2018 | Raman .................. | G06F 21/53 |

* cited by examiner

*Primary Examiner* — Christopher J Brown
(74) *Attorney, Agent, or Firm* — Chamberlain, Hrdlicka, White, Williams & Aughtry

(57) ABSTRACT

A method and system for implementing risk-based cyber security. Specifically, the disclosed method and system entail evaluating risk as a decision threshold for conducting cyber security assessments of system images within cloud computing environments. Further, the disclosed method and system pivot on intelligence pertaining to the latest cyber threats and/or vulnerabilities found worldwide.

18 Claims, 10 Drawing Sheets

METHOD AND SYSTEM FOR IMPLEMENTING RISK BASED CYBER SECURITY

BACKGROUND

The execution of cyber security tests on an actual computing system can be a disruptive process. The execution of these cyber security tests within a cloud-based testing sandbox resolves this dilemma, however, can be expensive with respect to expending time and computing resources.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element is distinct from a second element, and the first element may encompass more than one element and succeed (or precede) the second element in an ordering of elements.

In general, embodiments of the invention relate to a method and system for implementing risk-based cyber security. Specifically, one or more embodiments of the invention entails evaluating risk as a decision threshold for conducting cyber security assessments of system images within cloud computing environments. The disclosed method and system pivot on intelligence pertaining to the latest cyber threats and/or vulnerabilities found worldwide.

Figure 1:
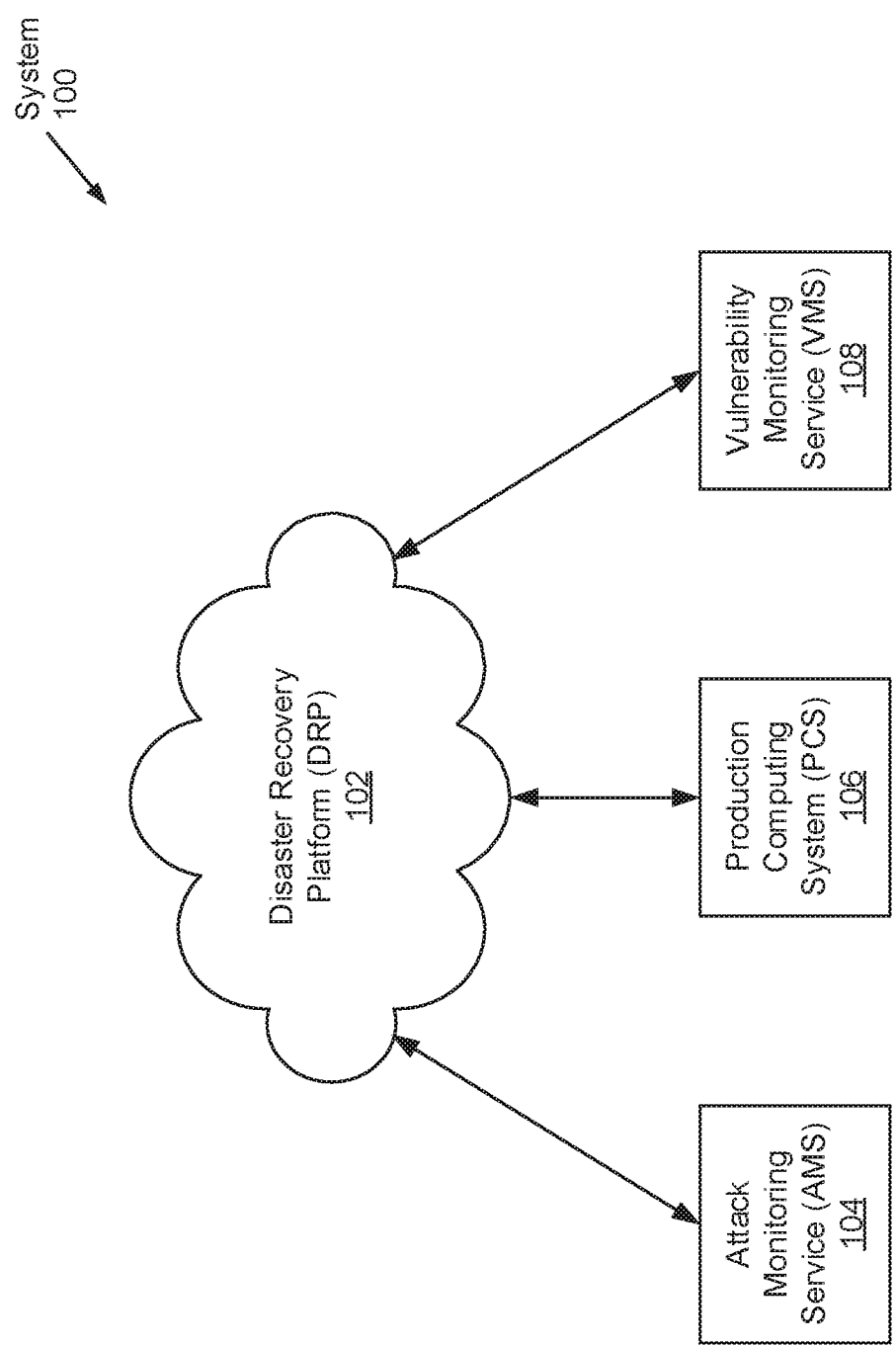
FIG. 1 shows a system in accordance with one or more embodiments of the invention.

FIG. 1 shows a system in accordance with one or more embodiments of the invention. The system (100) includes a disaster recovery platform (DRP) (102) operatively connected to an attack monitoring service (AMS) (104), a production computing system (PCS) (106), and a vulnerability monitoring service (VMS) (108). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the DRP (102) may be a hardware and/or software implemented service that provides failover and cyber security to a cloud computing environment. The DRP (102) may be implemented on one or more servers (not shown). Each server may be a physical server (i.e., in a datacenter) or a virtual server that may be cloud-based. In one embodiment of the invention, the DRP (102) may be implemented on one or more computing systems similar to the exemplary computing system shown in FIG. 6. Further, the DRP (102) may be any set of computing systems that may be programmed to receive requests, process requests, and based on the processing of requests, extend services and/or resources to the PCS (106). The DRP (102) is described in further detail below with respect to FIG. 2.

In one embodiment of the invention, an AMS (104) may be a cyber threat (or attack) intelligence platform and/or repository. An AMS (104) may be implemented on one or more servers (not shown). Each server may be a physical server (e.g., within a datacenter) or a virtual server that may be cloud-based. In one embodiment of the invention, an AMS (104) may be implemented on one or more computing systems similar to the exemplary computing system shown in FIG. 6. Further, an AMS (104) may include functionality to: (i) track and gather network traffic data pertaining to the latest cyber security threats or attacks incurring worldwide; (ii) process the gathered network traffic data to obtain intelligent threat/attack information (e.g., cyber threat/attack type, cyber threat/attack targets, cyber threat/attack origins, cyber threat/attack code, etc.); (iii) receive information requests from one or more requesting entities (e.g., the DRP (100)); and (iv) in return, provide information responses including at a portion of the obtained intelligent threat/attack information back to the requesting entities. One of ordinary skill will appreciate that an AMS (104) may perform other functionalities without departing from the scope of the invention. Examples of an AMS (104) include, but are not limited to, the Norse Intelligence Network offered by Norse Corp. of Forest City, Calif.; the Digital Attack Map offered by Jigsaw (formerly Google Ideas) of New York City, N.Y. and Arbor Networks of Burlington, Mass.; the ThreatCloud Managed Security Service offered by Check Point Software Technologies of Tel Aviv, Israel; the FireEye Cyber Threat Map offered by FireEye, Inc. of Milpitas, Calif.; and the CyberThreat Real-Time Map offered by Kaspersky Lab of Moscow, Russia.

In one embodiment of the invention, the PCS (106) may be any computing system (see e.g., FIG. 6) used for various applications. These applications may, for example, require large-scale and complex data processing. In one embodiment of the invention, the PCS (106) may be any computing system that may serve multiple users concurrently. Further, the PCS (106) may be programmed to provide and manage the allocation of computing resources towards the implementation of various processes (e.g., tasks) that may be instantiated by one or more users. With respect to interactions with the DRP (102), the PCS (106) may include functionality to: (i) generate application granularity images (AGIs) (described below) based on one or more applications (including operating systems (OSs)) that may be executing on the PCS (106); (ii) transmit generated AGIs to the DRP (102) for backup, archiving, and/or disaster recovery (DR) operations; and (iii) receive cyber protection reports (CPRs) (described below) from the DRP (102) relating to cyber security assessments performed by the DRP (102) on one or more AGIs pertaining to the PCS (106). One of ordinary skill will appreciate that the PCS (106) may perform other functionalities without departing from the scope of the invention. Examples of a PCS (106) include, but are not limited to, a cluster of interconnected desktop computers, laptop computers, smartphones, tablet computers, gaming consoles, servers, mainframes, or any combination thereof.

In one embodiment of the invention, a VMS (108) may be a security vulnerabilities intelligence platform and/or repository. A VMS (108) may be implemented on one or more servers (not shown). Each server may be a physical server (e.g., within a datacenter) or a virtual server that may be cloud-based. In one embodiment of the invention, a VMS (108) may be implemented on one or more computing systems similar to the exemplary computing system shown in FIG. 6. Further, a VMS (108) may include functionality to: (i) track and gather data pertinent to the latest known security vulnerabilities affecting software and hardware worldwide; (ii) process the gathered data to obtain intelligent vulnerabilities information (e.g., identifiers, signatures, description, type, status, and other metadata); (iii) receive information requests from one or more requesting entities (e.g., the DRP (102)); and (iv) in return, provide information responses including at a portion of the obtained intelligent vulnerabilities information back to the requesting entities. One of ordinary skill will appreciate that a VMS (108) may perform other functionalities without departing from the scope of the invention. Examples of a VMS (108) include, but are not limited to, the National Vulnerability Database (NVD) supported by the National Institute of Standards and Technology (NIST) of Gaithersburg, Md.; and the Open Vulnerability and Assessment Language (OVAL) standard, the Common Weakness Enumeration (CWE) dictionary, the Common Platform Enumeration (CPE) service, and the Common Vulnerabilities and Exposures (CVE) service supported by NIST of Gaithersburg, Md. and/or the Mitre Corporation of McLean, Va.

While FIG. 1 shows a configuration of components, other system configurations may be used without departing from the scope of the invention. For example, in one embodiment of the invention, the DRP (102) may be operatively connected to multiple AMSs (104), multiple PCSs (106), and/or multiple VMSs (108).

Figure 2:
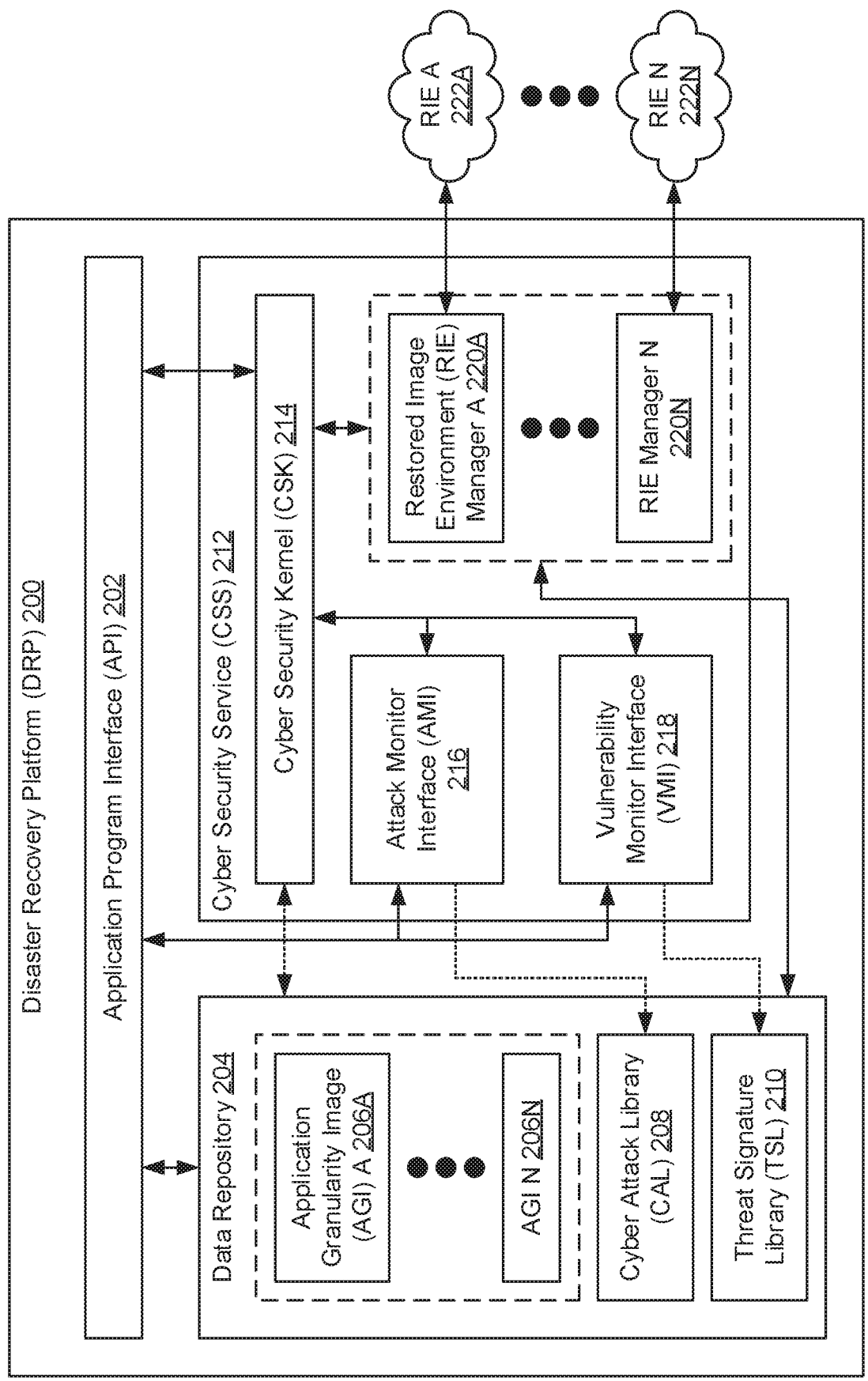
FIG. 2 shows a disaster recovery platform in accordance with one or more embodiments of the invention.

FIG. 2 shows a disaster recovery platform (DRP) in accordance with one or more embodiments of the invention. The DRP (200) includes an application program interface (API) (202), a data repository (204), and a cyber security service (CSS) (212). Each of these components is described below.

In one embodiment of the invention, the API (202) may be a hardware and/or software implemented construct that may provide a specification for the exchange of information between the DRP (200) and a AMS (not shown), between the DRP (200) and a PCS (not shown), or between the DRP (200) and a VMS (not shown). For example, the API (202) may establish that the exchange of information may entail a request for processing and a return of a response, if any, based on the outcome of the processing. In one embodiment of the invention, the API (202) may include logic necessary to access the data repository (204) and to interact with the CSS (212). By way of an example, the API (202) may be a web API accessed through a webpage and/or web browser, and a WAN (e.g., Internet) connection.

In one embodiment of the invention, the API (202) may include functionality to: (i) receive one or more application granularity images (AGIs) (206A-206N) (described below) from a PCS; (ii) access the data repository (204) to store obtained AGIs (206A-206N) therein; (iii) receive cyber protection reports (CPRs) (not shown) (described below) from the CSS (212); and (iv) encode and/or transmit received CPRs to a PCS. One of ordinary skill will appreciate that the API (202) may perform other functionalities without departing from the scope of the invention.

In one embodiment of the invention, the data repository (204) may be a storage system or medium for consolidating various forms of data. The data repository (204) may be implemented using any type of storage unit and/or device (e.g., a file system, a database, a collection of tables, or any other storage mechanism). Further, the data repository (204) may be implemented using multiple storage units and/or devices, which may or may not be of the same type or located at the same physical site. In one embodiment of the invention, the data repository (204) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (204) may be configured to store one or more AGIs (206A-206N). An AGI (206A-206N) may be an image-based snapshot of any granularity of an application executing on a PCS at a given time. Specifically, an AGI (206A-206N) may be an image-based snapshot of a portion of a full application, or alternatively, an image-based snapshot of a full application in entirety. More specifically, in one embodiment of the invention, an AGI (206A-206N) may be an exact copy of a computer process (i.e., an instance of a computer program) executing under a full application (i.e., a computer program) running/residing on a PCS at a given time. In such an embodiment, the computer process may implement a subset of the functionalities, features, and/or responsibilities of the full application under which the computer process is executing.

In another embodiment of the invention, an AGI (206A-206N) may be an exact copy of a full application (e.g., an operating system (OS), an email application, a word processing application, etc.), which may be represented through a set of computer processes that collectively implement all the functionalities, features, and/or responsibilities of the full application. Further, in either of the above-mentioned embodiments, an AGI (206A-206N) may additionally include state information detailing the state of the associated application granularity at the given time, as well as application configurations and data relevant to the associated application granularity at the given time. Furthermore, an AGI (206A-206N) may be generated at a PCS, or alternatively, by a data backup process (not shown) executing on the DRP (200). In one embodiment of the invention, an AGI (206A-206N) may be generated at periodic time intervals based on a backup schedule configured by administrators of a PCS.

Moreover, in one embodiment of the invention, a set of AGIs (206A-206N) associated with an application may be stored in a distinct application backup (not shown), which in turn may be stored in distinct PCS backups (not shown) within the data repository (204). A PCS backup may be a physical or logical partition of the data repository (204) reserved for the storage of application backups and other information pertinent to one of the one or more PCSs the DRP (200) may support. An application backup, on the other hand, may be a physical or logical partition of a PCS backup reserved for the storage of one or more AGIs (206A-206N) and other information pertinent to one of the one or more applications executing/residing on one of the one or more PCSs the DRP (200) may support.

For clarification of these terms, by way of an example, consider that the DRP (200) supports three PCSs on which two applications are executing on a first PCS, four applications are executing on a second PCS, and ten applications are executing on a third PCS, respectively. Subsequently, based on this configuration, the data repository (204) may be partitioned into three PCS backups, where: (i) the first PCS backup may be partitioned into two application backups, whereby each of the aforementioned application backups stores a set of one or more AGIs (206A-206N) associated with one of the two applications executing on the first PCS; (ii) the second PCS backup may be partitioned into four application backups, whereby each of the aforementioned application backups stores a set of one or more AGIs (206A-206N) associated with one of the four applications executing on the second PCS; and (iii) the third PCS backup may be partitioned into ten application backups, whereby each of the aforementioned application backups stores a set of one or more AGIs (206A_206N) associated with one of the ten applications executing on the third PCS.

In one embodiment of the invention, the data repository (204) may be configured to further store a cyber attack library (CAL) (208). The CAL (208) may be a repository for storing sets of computer readable program code, which when executed by a computer processor, enables the CSS (212) to administer one or more known cyber security attacks onto AGIs (206A-206N) restored within one or more restored image environments (RIEs) (222A-222N) (described below). Examples of cyber security attacks the CAL (208) may store include, but are not limited to including: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

In one embodiment of the invention, the data repository (204) may be configured to further store a threat signature library (TSL) (210). The TSL (210) may be a repository for storing known cyber threat/attack signatures. A cyber threat/attack signature (not shown) may be a piece of information (e.g., a recurring bit string, a data pattern, etc.) that uniquely identifies a particular cyber security threat/attack aimed at exploiting one or more weaknesses or vulnerabilities on a computing system (e.g., a PCS). Examples of cyber security threats (or attacks) associated with signatures that may be stored in the TSL (210) include, but are not limited to including: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware. One of ordinary skill will appreciate that the data repository (204) may be configured to store additional data without departing from the scope of the invention.

In one embodiment of the invention, the CSS (212) may be a sub-service of, or a feature hosted by, the DRP (200). Specifically, the CSS (212) may be an analytics driven computer service offered to a PCS over the Internet (e.g., the cloud). The CSS (212) may be implemented using hardware, software, firmware, or any combination thereof. Furthermore, the CSS (212) includes a cyber security kernel (CSK) (214), an attack monitor interface (AMI) (216), a vulnerability monitor interface (VMI) (218), and one or more RIE managers (220A-220N). Each of these components is described below.

In one embodiment of the invention, the CSK (214) may be an application or computer program for the CSS (212) that may be executing on the underlying hardware (e.g., servers) of the DRP (200). The CSK (214) may include functionality to: (i) access the data repository (204) to retrieve one or more AGIs (206A-206N); (ii) examine AGIs (206A-206N) to compile environment properties lists (EPLs) (described below); (iii) provide EPLs to the AMI (216) or the VMI (218); (iv) obtain relevant attack information (RAI) from the AMI (216); (v) obtain relevant vulnerability information (RVI) from the VMI (218); (vi) compute attack risk metrics (ARMs) using at least a portion of obtained RAI; (vii) compute vulnerability risk metrics (VRMs) using at least a portion of obtained RVI; (viii) instantiate one or more RIEs (222A-222N); (ix) configure RIEs (222A-222N) through the restoration of AGIs (206A-206N) therein; (x) create, configure, and/or delete one or more RIE managers (220A-220N); (xi) obtain cyber attack assessments (CAAs) and/or cyber vulnerability assessments (CVAs) (described below) from one or more RIE managers (220A-220N); (xii) generate CPRs based on obtained CAAs and/or obtained CVAs; and (xiii) relay generated CPRs to the API (202) for transmission towards a PCS. One of ordinary skill will appreciate that the CSK (214) may perform other functionalities without departing from the scope of the invention.

In one embodiment of the invention, the AMI (216) may be a computer process (or an instance of a computer program) executing on the underlying hardware of the DRP (200). Specifically, the AMI (216) may be a computer process dedicated towards interfacing with one or more AMSs (not shown). Thus, substantively, the AMI (216) may include functionality to: (i) obtain EPLs from the CSK (214); (ii) based on at least a portion of EPLs, issue information requests to one or more AMSs; (iii) receiving information responses from one or more AMSs as replies to the issued information requests; (iv) extract RAI from at least a portion of received information responses; (v) update the CAL (208) using the extracted RAI; and (vi) provide extracted RAI to the CSK (214) for ARM computations.

In one embodiment of the invention, the VMI (218) may be a computer process (or an instance of a computer program) executing on the underlying hardware of the DRP (200). Specifically, the VMI (218) may be a computer process dedicated towards interfacing with one or more VMSs (not shown). Thus, substantively, the VMI (218) may include functionality to: (i) obtain EPLs from the CSK (214); (ii) based on at least a portion of EPLs, issue information requests to one or more VMSs; (iii) receive information responses from one or more VMSs as replies to the issued information requests; (ix) extract RVI from at least a portion of received information responses; (v) update the TSL (210) using the extracted RVI; and (vi) provide extracted RVI to the CSK (214) for VRM computations.

In one embodiment of the invention, a RIE manager (220A-220N) may be a computer process (or an instance of a computer program) executing on the underlying hardware of the DRP (200). Specifically, a RIE manager (220A-220N) may be a computer process dedicated towards the management and/or monitoring of one RIE (222A-222N). Subsequently, in one embodiment of the invention, a RIE manager (220A-220N) may include functionality to: (i) access the CAL (208) to retrieve one or more sets of computer readable program code to apply one or more known cyber security attacks to AGIs (206A-206N) restored in RIEs (222A-222N); (ii) probe a RIE (222A-222N) by employing a variety of scanning methodologies (e.g., port scanning, network vulnerability scanning, web application security scanning, database security scanning, host based vulnerability scanning, etc.) to identify potential threat signatures (PTSs) (described below), or to discover weak points, residing in restored AGIs (206A-206N); (iii) access the TSL (210) to perform pattern comparisons between PTSs and known cyber threat/attack signatures stored in the TSL (210); (iv) generate CAAs and/or CVAs based on the probing; and (v) provide generated CAAs and CVAs to the CSK (214).

In one embodiment of the invention, a RIE (222A-222N) may be an isolated (i.e., closed and protected) cloud computing environment for executing cyber security assessments. Said another way, a RIE (222A-222N) may be a cloud based testing sandbox. Further, in one embodiment of the invention, a RIE (222A-222N) may be implemented using a subset of the servers and/or computing systems (see e.g., FIG. 6) that the form the DRP (200). In another embodiment of the invention, a RIE (222A-222N) may be implemented using a set of servers and/or computing systems that exclude those from, yet may still be overseen by, the DRP (200). Moreover, isolation of a RIE (222A-222N) may be generated through the implementation of a network configuration on a cloud computing network. The network configuration may, for example, limit access to the RIE (222A-222N) from external sources (e.g., PCSs, AMSs, VMSs, other RIEs (222A-222N), etc.) (with the exception of the availability of one or more computer ports through which an authorized RIE manager (220A-220N) may monitor/probe the RIE (222A-222N). The network configuration may further, for example, obstruct access to external elements (e.g., PCSs, AMSs, VMSs, other RIEs (222A-222N), etc.) by the computing resources (i.e., virtual machines, containers, etc.) executing within and/or implementing the RIE (222A-222N).

FIGS. 3A-3D show flowcharts describing a method for implementing a risk-based cyber security service in accordance with one or more embodiments of the invention. While the various steps in the flowcharts are presented and described sequentially, one of ordinary skill will appreciate that some or all steps may be executed in parallel. In one embodiment of the invention, the steps shown in FIGS. 3A-3D may be performed in parallel with any other steps shown in FIGS. 4A-4D without departing from the scope of the invention.

Furthermore, the following iteration of steps (i.e., Steps 300 through 362) may be performed for each PCS the DRP supports. In one embodiment of the invention, the attending of each PCS, and thus, the performing of each iteration of steps, may occur sequentially. In another embodiment of the invention, the attending of each PCS, and thus, the performing of each iteration of steps, may occur concurrently.

Figure 3A:
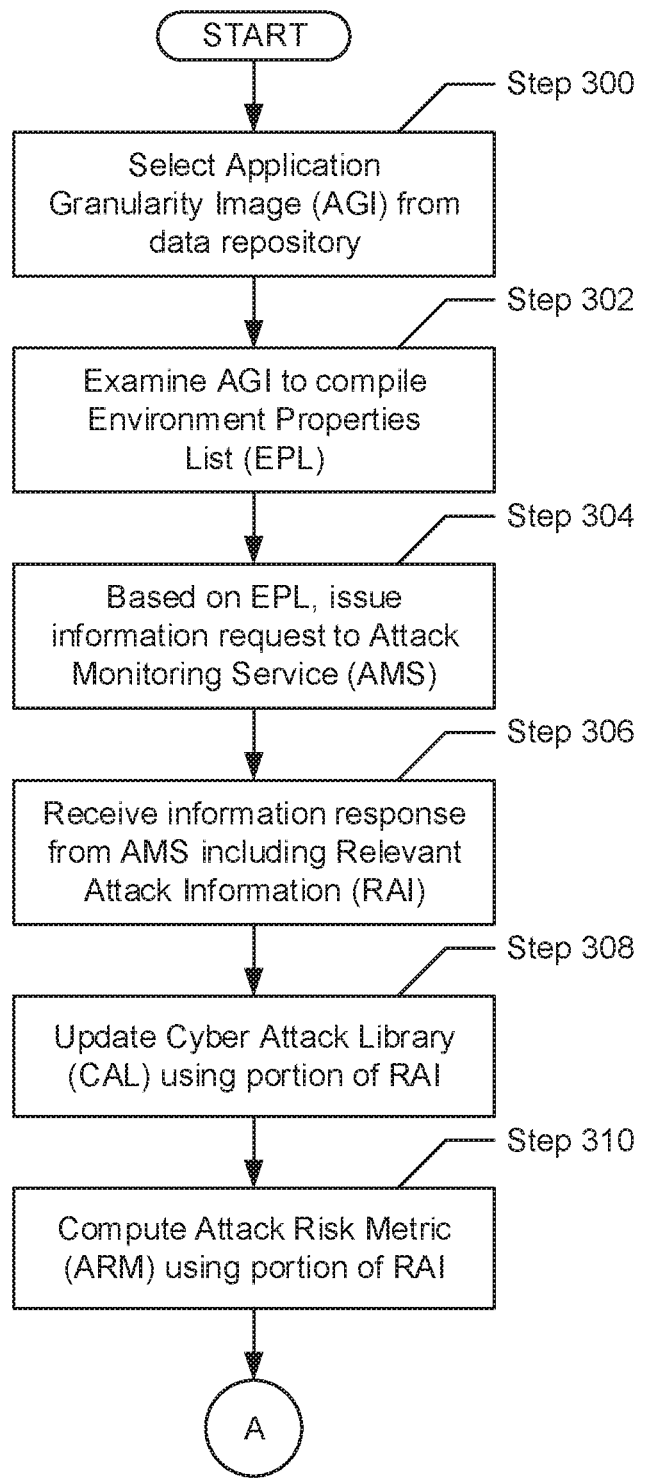
FIGS. 3A-3D show flowcharts describing a method for implementing a risk-based cyber security service in accordance with one or more embodiments of the invention.

Turning to FIG. 3A, in Step 300, the CSK (see e.g., FIG. 2) selects a set of one or more AGIs stored in the data repository of the DRP. Specifically, in one embodiment of the invention, the CSK may select/retrieve the set of one or more AGIs from one or more application backups (i.e., partitions) in a PCS backup (described above) from within the data repository. Selection of which one or more AGIs to retrieve may depend, for example, on a preset cyber protection plan or schedule configured by administrators of the PCS with which the AGIs are associated.

Further, in one embodiment of the invention, the set of AGIs may include one AGI, where the one AGI identifies a computer process (i.e., an instance of a computer program implementing one or more functionalities, features, and/or responsibilities) associated with an application executing on a PCS. In another embodiment of the invention, the set of AGIs may include one AGI, where the one AGI identifies a full application (i.e., a computer program), which may be implemented using multiple computer processes. Alternatively, the full application may be identified through multiple AGIs specified in the set of AGIs, where each AGI of the set of AGIs implements a portion (i.e., a subset of the functionalities, features, and/or responsibilities) of the full application. In yet another embodiment of the invention, the set of AGIs may include multiple AGIs, where each mutually exclusive subset of the multiple AGIs identifies at least a portion of a different application executing on a PCS. Thus, in such an embodiment, the multiple AGIs may collectively implement multiple applications (which may or may not include an OS), which may identify a portion of a computing system (i.e., a PCS), if not a full computing system in its entirety. Furthermore, in one embodiment of the invention, each AGI in the set of AGIs may correspond to a snapshot of an application granularity executing on a PCS within a margin of time from an exact given time.

In Step 302, the CSK examines the set of AGIs (selected in Step 300) to compile an environment properties list (EPL). In one embodiment of the invention, an EPL may be a report identifying a computing system's (e.g., PCS's) system specifications. More specifically, an EPL may identify at least a portion, if not all, hardware and software installed on a PCS that may be derived from the set of AGIs. Examples of system specifications that may be identified include, but are not limited to including: computer processing units (CPUs), motherboards, memory, storage devices, audio and/or video cards, graphical processing units (GPUs), peripheral devices, operating systems (OSs), applications, device drivers, basic input/output systems (BIOS s), or any other hardware and/or software components installed on the PCS physical machine and associated executing virtual machines, if any. Furthermore, compilation of the EPL may entail execution of one or more existing or future developed hardware detection, software detection, and/or system configuration monitoring algorithms.

In Step 304, the CSK provides the EPL (compiled in Step 302) to the AMI. Subsequently, in one embodiment of the invention, the AMI issues an information request to one or more AMSs based on the provided EPL. As mentioned above, an AMS may be a cyber threat (or attack) intelligence platform and/or repository, which may include functionality to gather and share intelligent threat/attack information pertaining to the latest cyber security threats or attacks incurring worldwide. Further, in one embodiment of the invention, the information request may specify one or more system hardware and/or software components identified in the EPL.

In Step 306, the AMI receives the above-mentioned intelligent threat/attack information (also disclosed herein as relevant attack information (RAI)) from one or more AMSs. Specifically, in one embodiment of the invention, the RAI may specify data and/or metadata (e.g., cyber threat/attack type, cyber threat/attack targets, cyber threat/attack origins, cyber threat/attack code, etc.) associated with one or more cyber security threats (or attacks) that exploit or target one or more system hardware and/or software components identified in the EPL. For example, consider the EPL had identified the following components installed on a PCS: the Windows 8.1 64-bit OS, the Intel Core i7 3517U processor, the Ivy Bridge 22 nm chipset, and the Lenovo Invalid (U3E1) motherboard. Then, the RAI may specify one or more known cyber security threats/attacks that specifically target, either individually or in combination, these four identified hardware and software components.

In Step 308, the AMI subsequently updates the CAL using a portion of the RAI (received in Step 306). Specifically, in one embodiment of the invention, the AMI may extract computer readable program code associated with the one or more known cyber security threats/attacks for which RAI is received. The extracted computer readable program code may later enable the CSS to administer the one or more known cyber security threats/attacks onto AGIs when undergoing assessment. Thereafter, updating the CAL may entail the AMI accessing the CAL to store the aforementioned computer readable program code therein.

In Step 310, the AMI provides the remainder (or another portion) of the RAI (received in Step 306) to the CSK. In one embodiment of the invention, the remainder or other portion of the RAI may include, but is not limited to including, data and/or metadata that identifies the geographic origins, the geographic targets, the exploited hardware and/or software components, the threat/attack types, the impact severities, etc. of the one or more known cyber security threats/attacks associated with the RAI. Afterwards, the CSK may use this information as factors towards computing an attack risk metric (ARM) for each known cyber security threat/attack associated with the RAI. In one embodiment of the invention, an ARM may quantify the potential risk a known cyber security threat/attack may impose on the PCS (with which the set of AGIs selected in Step 300 is associated). That is, an ARM may specify the expected probability or likelihood one or more hardware and/or software components of a PCS may be susceptible to malicious activities administered by a known cyber security threat/attack.

In one embodiment of the invention, the severity of the risk quantified by an ARM, for a known cyber security threat/attack, may be scaled based on at least the following determinations: (i) whether new vulnerabilities have been found to exist in one or more system specifications (i.e., hardware and/or software components installed in the system (e.g., the PCS)) specified in the EPL; (ii) whether the known cyber security threat/attack, published by one or more AMS s, has been cited in recent incidents targeting the aforementioned new vulnerabilities; (iii) whether versions of the PCS specification(s) match versions of targeted hardware and/or software component(s) involved in the aforementioned recent incidents; (iv) whether the PCS environment is similar to the computing system environment(s) on which the targeted hardware/software component(s) resided (e.g., similarity of platforms, hypervisors, etc.); and (v) whether the classification (e.g., work productivity, entertainment, simulation, etc.) of PCS specification(s) relate to or match the classification of the targeted hardware/software component(s).

Figure 3B:
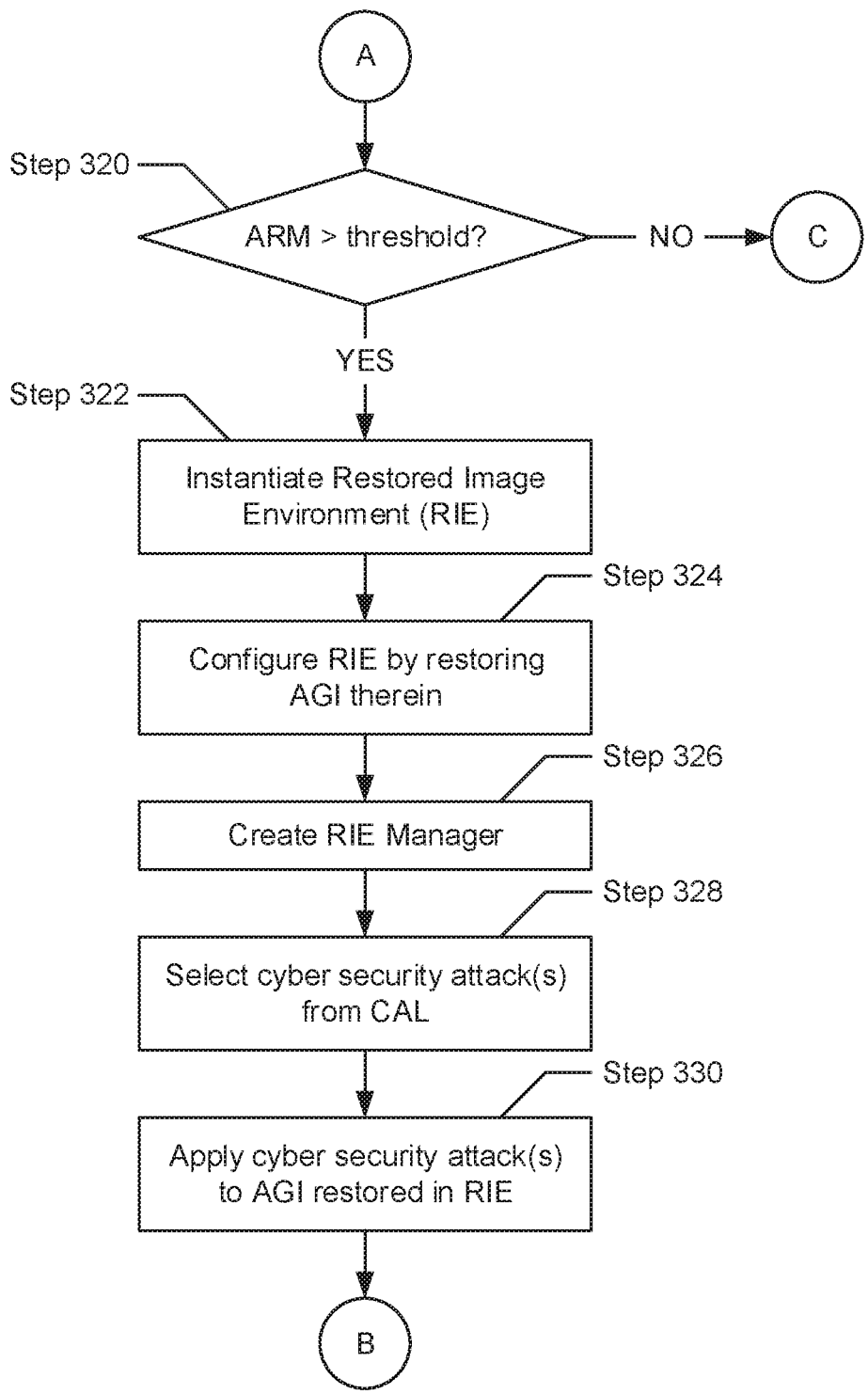

Turning to FIG. 3B, in Step 320, a determination by the CSK is made as to whether an ARM (computed in Step 310) exceeds an attack risk threshold. The attack risk threshold may refer to a predetermined, yet adjustable, threshold probability value beyond which the allocation of cloud environment computing resources to further investigate the effect of a cyber security threat/attack manifests. Thus, in one embodiment of the invention, the determination may serve to restrict the execution of cyber security assessments, which tend to be time and resources expensive, to fulfilling the evaluation of higher risk scenarios. Subsequently, if it is determined that an ARM exceeds the attack risk threshold, the process proceeds to Step 322. On the other hand, if it is alternatively determined that an ARM falls short of the attack risk threshold, the process proceeds to Step 360 (see e.g., FIG. 3D).

In one embodiment of the invention, the aforementioned determination and the subsequent steps to follow may be performed for each ARM of the one or more ARMs computed in Step 310. Each ARM may quantify the risk estimated for one of the one or more known cyber security threats/attacks (i.e., hereafter referred to as the current known cyber security threat/attack) with which the RAI (received in Step 306) is associated.

In Step 322, after determining (in Step 320) that an ARM exceeds the attack risk threshold, the CSK concludes that the risk level warrants further investigation. Subsequently, in one embodiment of the invention, the CSK proceeds to instantiate a RIE. Instantiation of a RIE may entail the allotment/dedication of cloud environment computing resources (e.g., computer processors, memory, persistent and/or non-persistent storage, network bandwidth, etc.) towards the creation and deployment of a cloud-based testing sandbox. Further, in one embodiment of the invention, the aforementioned cloud environment computing resources may derive from the servers and/or computing systems forming the DRP. In another embodiment of the invention, the cloud environment computing resources may derive from other servers and/or computing systems excluded from, yet may still be overseen by, the DRP.

In Step 324, the CSK subsequently configures the RIE (instantiated in Step 322). Specifically, in one embodiment of the invention, configuration of the RIE may entail restoring the set of AGIs (selected/retrieved in Step 300) therein. More specifically, the CSK may allocate additional cloud environment computing resources towards the instantiation of one or more virtual machines (VMs) and/or containers directed at emulating the behavior, functionalities, and/or interactivities of and between each AGI of the set of AGIs.

In one embodiment of the invention, a VM may be a distinct operating environment configured to inherit underlying functionality of the host OS (and access to the underlying host hardware) via an abstraction layer. Further, a VM may include a separate instance of an OS, which may be distinct from the host OS. By way of one example, one or more embodiments of the invention may be implemented based on VMware® architecture, which may involve: (i) one or more VMs executing on a host computer system (i.e., the DRP) such that each VM serves as a host to an instance of a guest OS; and (ii) a hypervisor layer serving to facilitate intra-host communication between the one or more VMs and the host computer system hardware. VMware® is a registered trademark of VMware, Inc.

In one embodiment of the invention, a container may be an isolated, lightweight virtualization mechanism (or software construct) that allows for the running of a computer process, an application, or an OS within the container without the overhead of executing a hypervisor (as is needed for executing VMs on underlying hardware). Minimal overhead may be generated by containers because: (i) containers share the same OS kernel with other containers and the underlying host (e.g., the DRP); and (ii) containers (unlike VMs) do not need to emulate physical hardware.

In Step 326, after configuring the RIE, the CSK creates a RIE manager (see e.g., FIG. 2). In one embodiment of the invention, creation of the RIE manager may entail the dedication of at least one computer process (or instance of a computer program) executing within the CSS. Thereafter, the dedicated computer process(es) may be afforded with functionalities befitting those necessary for administering the current known cyber security threat/attack, monitoring and probing the RIE, and generating a cyber-attack assessment (CAA) (described below).

In Step 328, the RIE manager (created in Step 326) selects the current known cyber security threat/attack (i.e., one known cyber security threat/attack in the set of one or more known cyber security threats/attacks disclosed in the RAI). Specifically, the RIE manager may access the CAL to retrieve a script/set of computer readable program code (which was earlier stored in the CAL by the AMI in Step 308). The script/set may represent the algorithm for implementing the current cyber security threat/attack.

In Step 330, the RIE manager applies the current known cyber security threat/attack. Specifically, in one embodiment of the invention, the RIE manager may execute the obtained script/set of computer readable program code (obtained from the CAL in Step 328) in order to apply the current cyber security threat/attack onto the set of AGIs (that were restored in the RIE in Step 324).

Figure 3C:
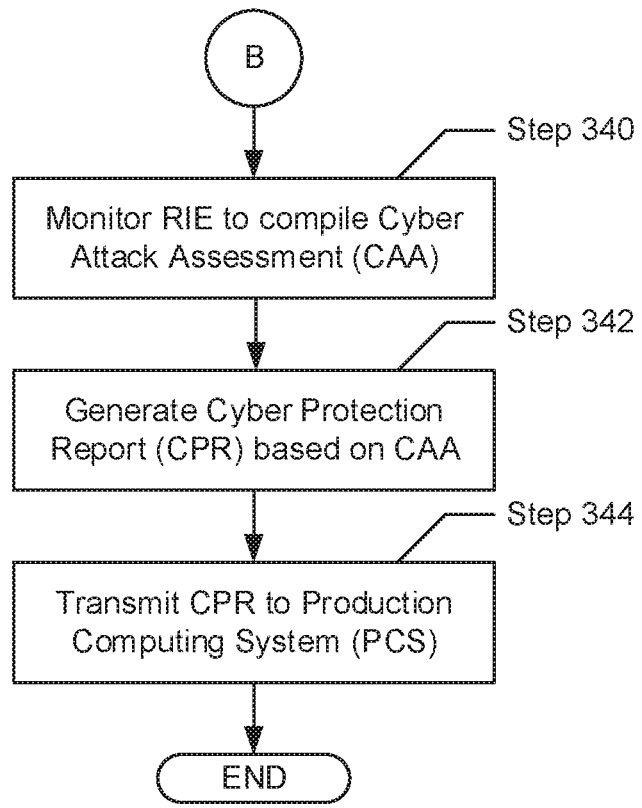

Turning to FIG. 3C, in Step 340, the RIE manager then monitors the RIE during or following the application of the current known cyber security threat/attack. In one embodiment of the invention, the RIE manager may monitor the RIE to expose, detect, and/or assess for any cyber security vulnerabilities. A cyber security vulnerability may be a flaw or weakness in system design, implementation, operation, internal controls, or management that could be exploited (either accidentally or intentionally). Further, exploitation of a vulnerability may result in a security breach of the system, which may lead to, for example, data loss, exposure of sensitive data, lack of accountability, denial of access, data corruption, system hijacking and/or impersonation, and other undesirable outcomes. In one embodiment of the invention, monitoring of the RIE and/or of the set of AGIs restored in the RIE may entail the employing of one or more existing or future developed scanning techniques, which may include, but are not limited to, techniques directed to port scanning, network vulnerability scanning, web application security scanning, database security scanning, and host based vulnerability scanning.

Moreover, in one embodiment of the invention, the RIE manager may monitor the RIE to compile a cyber attack assessment (CAA). The CAA may be a report detailing the vulnerabilities exposed in one or more AGIs of the set of AGIs restored in the RIE. Further, the CAA may additionally detail the circumstances under which each of the vulnerabilities, if any, had been detected. These circumstances may include, but are not limited to including: (i) which hardware and/or software component(s) of the set of AGIs (and thus the PCS) was/were discovered to be the flaw or weakness; (ii) which cyber security threat/attack (i.e., the current cyber security threat/attack) exploited the discovered flaw(s) or weakness(es); and (iii) the extent and severity of effects introduced by the current cyber security threat/attack on the set of AGIs, and potentially, the PCS. Hereafter, the RIE manager may provide the generated CAA to the CSK.

In Step 342, the CSK subsequently generates a cyber protection report (CPR) based on the CAA (compiled by the RIE manager in Step 340). In one embodiment of the invention, the CPR may be a report summarizing the content (mentioned above) disclosed within the CAA. In another embodiment of the invention, the CPR may further include one or more recommendations for patching the one or more vulnerabilities disclosed in the CAA. Furthermore, in one embodiment of the invention, the CSK may generate a CPR for each CAA detailing the evaluation of the set of AGIs subjected to just the current known cyber security threat/attack. In another embodiment of the invention, the CSK may wait to generate one CPR encompassing all the CAAs detailing the evaluation of the set of AGIs subjected to all of the one or more known cyber security threats/attacks that were associated with the RAI (received in Step 306).

In Step 344, after generating the one or more CPRs (in Step 342), the CSK forwards the CPR(s) to the API executing on the DRP. Thereafter, the API may format and/or encode the CPR(s) based on the specification for data exchange agreed upon between the DRP and the PCS, and finally, transmit the CPR(s) towards the PCS.

Figure 3D:
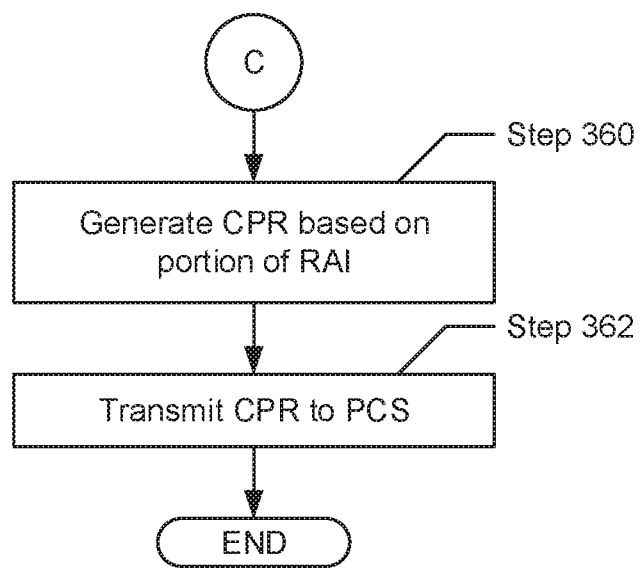

Turning to FIG. 3D, in Step 360, after determining (in Step 320) that an ARM falls short of the attack risk threshold, the CSK concludes that the risk level does not warrant further investigation. Subsequently, in one embodiment of the invention, the CSK proceeds to generate a CPR based on the remaining (or other) portion of the RAI (received in Step 306) that pertains to the current known cyber security threat/attack. In another embodiment of the invention, the CPR may be generated based on the remaining (or other) portion of the RAI that pertains to all of the one or more cyber security threats/attacks disclosed in the RAI.

Substantively, the CPR may be a report summarizing data and/or metadata (e.g., cyber threat/attack type, cyber threat/attack targets, cyber threat/attack origins, etc.) associated with one or more cyber security threats (or attacks) that exploit or target one or more system hardware and/or software components identified in the EPL (compiled in Step 302).

In Step 362, after generating the one or more CPRs (in Step 360), the CSK forwards the CPR(s) to the API executing on the DRP. Thereafter, the API may format and/or encode the CPR(s) based on the specification for data exchange agreed upon between the DRP and the PCS, and finally, transmit the CPR(s) towards the PCS.

FIGS. 4A-4D show flowcharts describing a method for implementing a risk-based cyber security service in accordance with one or more embodiments of the invention. While the various steps in the flowcharts are presented and described sequentially, one of ordinary skill will appreciate that some or all steps may be executed in parallel. In one embodiment of the invention, the steps shown in FIGS. 4A-4D may be performed in parallel with any other steps shown in FIGS. 4A-4D without departing from the scope of the invention.

Furthermore, the following iteration of steps (i.e., Steps 400 through 462) may be performed for each PCS the DRP supports. In one embodiment of the invention, the attending of each PCS, and thus, the performing of each iteration of steps, may occur sequentially. In another embodiment of the invention, the attending of each PCS, and thus, the performing of each iteration of steps, may occur concurrently.

Figure 4A:
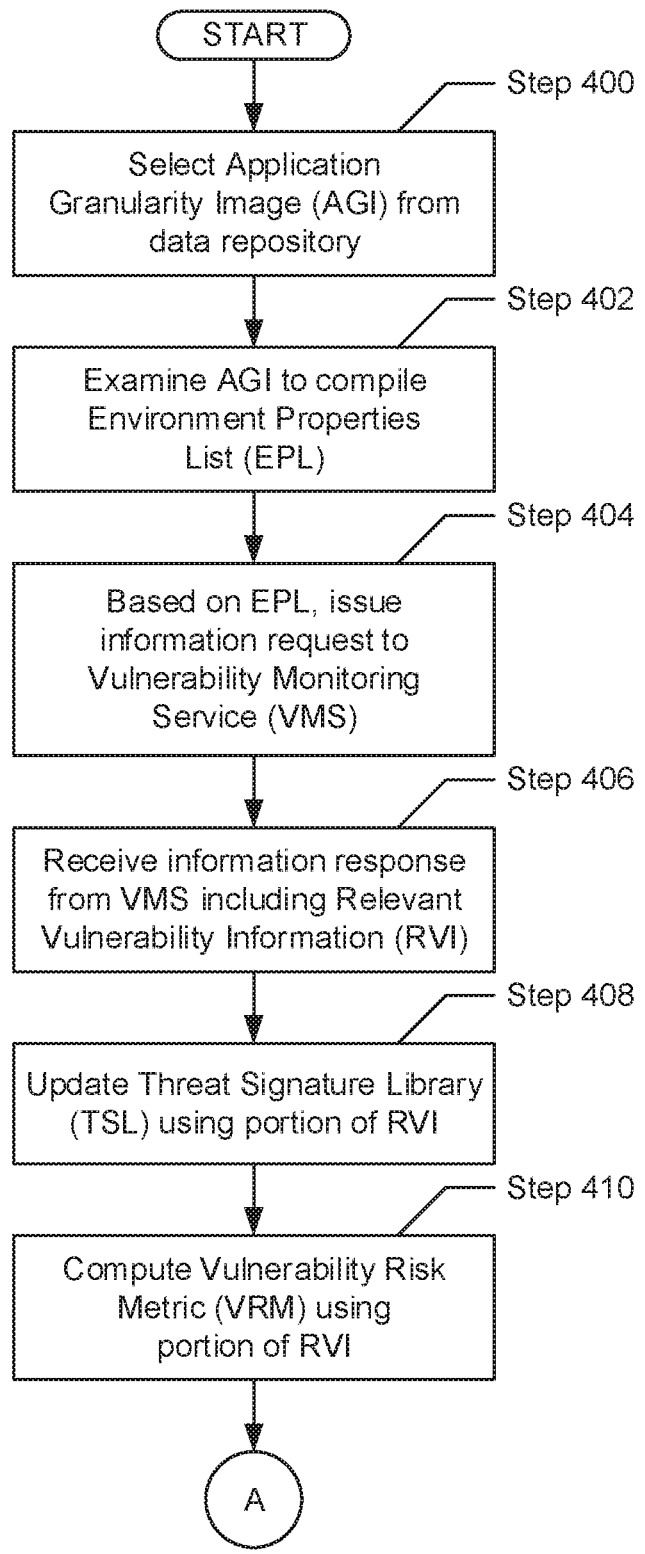
FIGS. 4A-4D show flowcharts describing a method for implementing a risk-based cyber security service in accordance with one or more embodiments of the invention.

Turning to FIG. 4A, in Step 400, the CSK (see e.g., FIG. 2) selects a set of one or more AGIs stored in the data repository of the DRP. Specifically, in one embodiment of the invention, the CSK may select/retrieve the set of one or more AGIs from one or more application backups (i.e., partitions) in a PCS backup (described above) from within the data repository. Selection of which one or more AGIs to retrieve may depend, for example, on a preset cyber protection plan or schedule configured by administrators of the PCS with which the AGIs are associated.

Further, in one embodiment of the invention, the set of AGIs may include one AGI, where the one AGI identifies a computer process (i.e., an instance of a computer program implementing one or more functionalities, features, and/or responsibilities) associated with an application executing on a PCS. In another embodiment of the invention, the set of AGIs may include one AGI, where the one AGI identifies a full application (i.e., a computer program), which may be implemented using multiple computer processes. Alternatively, the full application may be identified through multiple AGIs specified in the set of AGIs, where each AGI of the set of AGIs implements a portion (i.e., a subset of the functionalities, features, and/or responsibilities) of the full application. In yet another embodiment of the invention, the set of AGIs may include multiple AGIs, where each mutually exclusive subset of the multiple AGIs identifies at least a portion of a different application executing on a PCS. Thus, in such an embodiment, the multiple AGIs may collectively implement multiple applications (which may or may not include an OS), which may identify a portion of a computing system (i.e., a PCS), if not a full computing system in its entirety. Furthermore, in one embodiment of the invention, each AGI in the set of AGIs may correspond to a snapshot of an application granularity executing on a PCS within a margin of time from an exact given time.

In Step 402, the CSK examines the set of AGIs (selected in Step 400) to compile an environment properties list (EPL). In one embodiment of the invention, an EPL may be a report identifying a computing system's (e.g., PCS's) system specifications. More specifically, an EPL may identify at least a portion, if not all, hardware and software installed on a PCS that may be derived from the set of AGIs. Examples of system specifications that may be identified include, but are not limited to including: computer processing units (CPUs), motherboards, memory, storage devices, audio and/or video cards, graphical processing units (GPUs), peripheral devices, operating systems (OSs), applications, device drivers, basic input/output systems (BIOS s), or any other hardware and/or software components installed on the PCS physical machine and associated executing virtual machines, if any. Furthermore, compilation of the EPL may entail execution of one or more existing or future developed hardware detection, software detection, and/or system configuration monitoring algorithms.

In Step 404, the CSK provides the EPL (compiled in Step 402) to the VMI. Subsequently, in one embodiment of the invention, the VMI issues an information request to one or more VMSs based on the provided EPL. As mentioned above, an VMS may be a security vulnerabilities intelligence platform and/or repository, which may include functionality to gather and share intelligent vulnerabilities information pertaining to the latest known security vulnerabilities affecting software and hardware worldwide. Further, in one embodiment of the invention, the information request may specify one or more system hardware and/or software components identified in the EPL.

In Step 406, the VMI receives the above-mentioned intelligent vulnerabilities information (also disclosed herein as relevant vulnerability information (RVI)) from one or more VMSs. Specifically, in one embodiment of the invention, the RVI may specify data and/or metadata (e.g., identifiers, signatures, description, type, status, etc.) associated with one or more cyber security vulnerabilities that one or more system hardware and/or software components identified in the EPL is/are known to exhibit. For example, consider the EPL had identified the following components installed on a PCS: the Windows 8.1 64-bit OS, the Intel Core i7 3517U processor, the Ivy Bridge 22 nm chipset, and the Lenovo Invalid (U3E1) motherboard. Then, the RAI may specify one or more known cyber security vulnerabilities that each of the four identified hardware and software components, either individually or in combination, exhibit.

In one embodiment of the invention, a cyber security vulnerability may be a flaw or weakness in system design, implementation, operation, internal controls, or management that could be exploited (either accidentally or intentionally). Further, exploitation of a vulnerability may result in a security breach of the system, which may lead to, for example, data loss, exposure of sensitive data, lack of accountability, denial of access, data corruption, system hijacking and/or impersonation, and other undesirable outcomes.

In Step 408, the VMI subsequently updates the TSL using a portion of the RVI (received in Step 406). Specifically, in one embodiment of the invention, the VMI may extract signatures (i.e., pieces of information such as a recurring bit string, a data pattern, etc.) that uniquely identifies the one or more cyber security threats/attacks known to exploit/target the cyber security vulnerabilities disclosed by the RVI. The extracted signatures may later enable the CSS to identify potential threat signatures (PTSs) (described below) exhibited within AGIs when undergoing assessment. Thereafter, updating the TSL may entail the VMI accessing the TSL to store the aforementioned signatures therein.

In Step 410, the VMI provides the remainder (or another portion) of the RVI (received in Step 406) to the CSK. In one embodiment of the invention, the remainder or other portion of the RVI may include, but is not limited to including, data and/or metadata (e.g., description, type, status, etc.) that further describes the one or more cyber security vulnerabilities disclosed by the RVI. Afterwards, the CSK may use this information as factors towards computing an vulnerability risk metric (VRM) for each cyber security vulnerability disclosed by the RVI. In one embodiment of the invention, a VRM may quantify the potential risk a cyber security vulnerability may impose on the PCS (with which the set of AGIs selected in Step 400 is associated). That is, a VRM may specify the expected probability or likelihood one or more hardware and/or software components of a PCS may be susceptible to a cyber security vulnerability.

In one embodiment of the invention, the severity of the risk quantified by a VRM, for a cyber security vulnerability, may be scaled based on at least the following determinations: (i) whether the versions of the PCS specification(s) (i.e., one or more hardware and/or software components residing on the PCS) match the versions of similar components, published by one or more VMSs, which are known to exhibit the cyber security vulnerability; (ii) whether one, a few, or a substantial number of known cyber security threats/attacks exploit the cyber security vulnerability; and (iii) based on the native risk rating for the cyber security vulnerability designated by one or more VMSs.

Figure 4B:
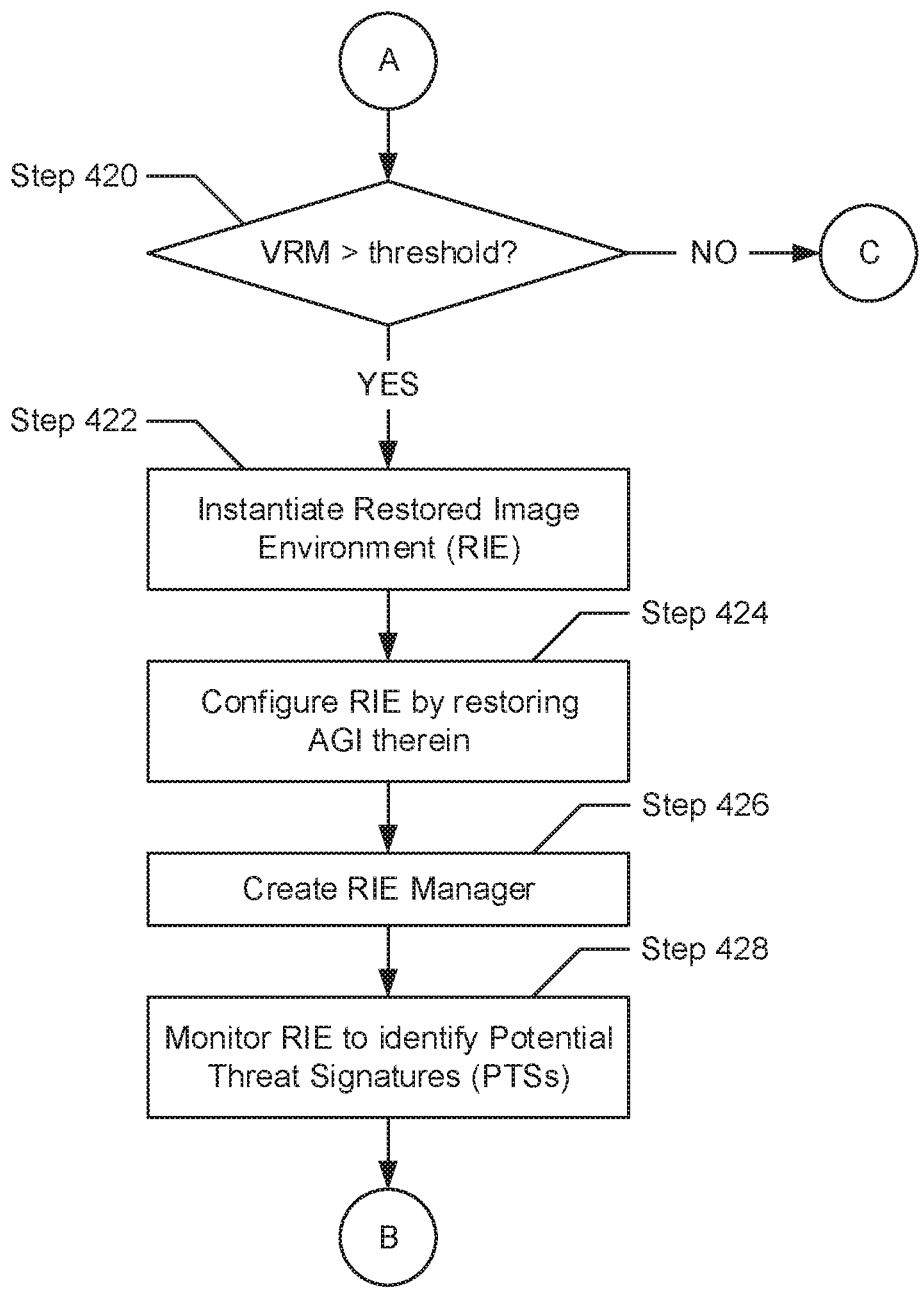

Turning to FIG. 4B, in Step 420, a determination by the CSK is made as to whether a VRM (computed in Step 410) exceeds a vulnerability risk threshold. The vulnerability risk threshold may refer to a predetermined, yet adjustable, threshold probability value beyond which the allocation of cloud environment computing resources to further investigate the effect of a cyber security vulnerability manifests. Thus, in one embodiment of the invention, the determination may serve to restrict the execution of cyber security assessments, which tend to be time and resources expensive, to fulfilling the evaluation of higher risk scenarios. Subsequently, if it is determined that a VRM exceeds the vulnerability risk threshold, the process proceeds to Step 422. On the other hand, if it is alternatively determined that a VRM falls short of the vulnerability risk threshold, the process proceeds to Step 460 (see e.g., FIG. 4D).

In one embodiment of the invention, the aforementioned determination and the subsequent steps to follow may be performed for each VRM of the one or more VRMs computed in Step 410. Each VRM may quantify the risk estimated for one of the one or more cyber security vulnerabilities (i.e., hereafter referred to as the current cyber security vulnerability) with which the RVI (received in Step 406) is associated.

In Step 422, after determining (in Step 420) that a VRM exceeds the vulnerability risk threshold, the CSK concludes that the risk level warrants further investigation. Subsequently, in one embodiment of the invention, the CSK proceeds to instantiate a RIE. Instantiation of a RIE may entail the allotment/dedication of cloud environment computing resources (e.g., computer processors, memory, persistent and/or non-persistent storage, network bandwidth, etc.) towards the creation and deployment of a cloud-based testing sandbox. Further, in one embodiment of the invention, the aforementioned cloud environment computing resources may derive from the servers and/or computing systems forming the DRP. In another embodiment of the invention, the cloud environment computing resources may derive from other servers and/or computing systems excluded from, yet may still be overseen by, the DRP.

In Step 424, the CSK subsequently configures the RIE (instantiated in Step 422). Specifically, in one embodiment of the invention, configuration of the RIE may entail restoring the set of AGIs (selected/retrieved in Step 400) therein. More specifically, the CSK may allocate additional cloud environment computing resources towards the instantiation of one or more virtual machines (VMs) and/or containers directed at emulating the behavior, functionalities, and/or interactivities of and between each AGI of the set of AGIs.

In one embodiment of the invention, a VM may be a distinct operating environment configured to inherit underlying functionality of the host OS (and access to the underlying host hardware) via an abstraction layer. Further, a VM may include a separate instance of an OS, which may be distinct from the host OS. By way of one example, one or more embodiments of the invention may be implemented based on VMware® architecture, which may involve: (i) one or more VMs executing on a host computer system (i.e., the DRP) such that each VM serves as a host to an instance of a guest OS; and (ii) a hypervisor layer serving to facilitate intra-host communication between the one or more VMs and the host computer system hardware. VMware® is a registered trademark of VMware, Inc.

In one embodiment of the invention, a container may be an isolated, lightweight virtualization mechanism (or software construct) that allows for the running of a computer process, an application, or an OS within the container without the overhead of executing a hypervisor (as is needed for executing VMs on underlying hardware). Minimal overhead may be generated by containers because: (i) containers share the same OS kernel with other containers and the underlying host (e.g., the DRP); and (ii) containers (unlike VMs) do not need to emulate physical hardware.

In Step 426, after configuring the RIE, the CSK creates a RIE manager (see e.g., FIG. 2). In one embodiment of the invention, creation of the RIE manager may entail the dedication of at least one computer process (or instance of a computer program) executing within the CSS. Thereafter, the dedicated computer process(es) may be afforded with functionalities befitting those necessary for monitoring and probing the RIE, identifying PTSs as being associated with known cyber security threats/attacks that may be exploiting the current cyber security vulnerability undergoing observation, and generating a cyber vulnerability assessment (CVA) (described below).

In Step 428, the RIE manager (created in Step 426) monitors or probes the RIE. In one embodiment of the invention, monitoring or probing the RIE may entail employing one or more data scanning techniques, which may include, but are not limited to, techniques directed to port scanning, network vulnerability scanning, web application security scanning, database security scanning, and host based vulnerability scanning. Further, the employed scanning techniques may be used to search for potential threat signatures (PTSs) (e.g., unique recurring bit strings, data patterns, etc.) potentially representative of one or more known cyber security threats or attacks that may be exploiting the current cyber security vulnerability being investigated.

Figure 4C:
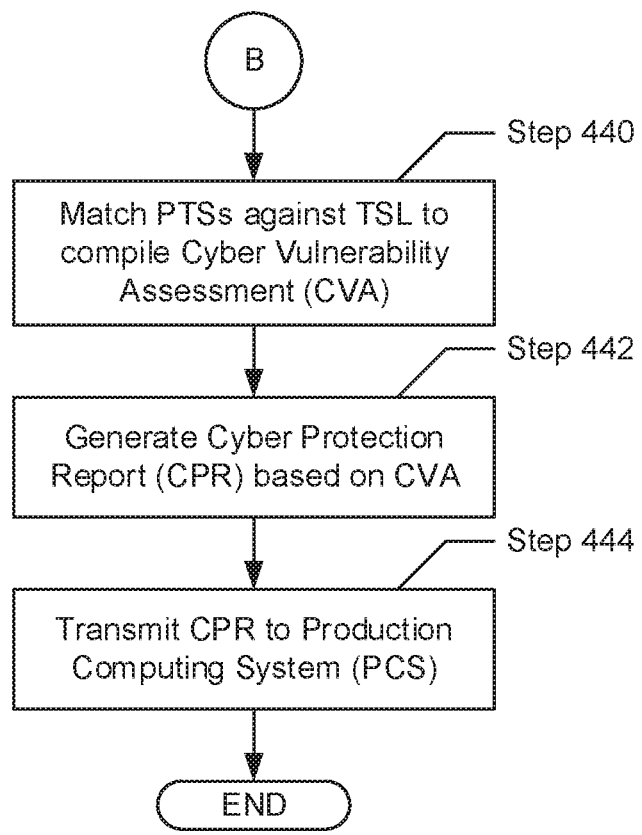

Turning to FIG. 4C, in Step 440, the RIE manager subsequently compares any PTSs (detected in Step 428) against the one or more known cyber security threat/attack signatures stored in the TSL. In one embodiment of the invention, the comparing may lead to the matching of one or more PTSs to one or more of the known cyber security threat/attack signatures. A matched signature may affirm that the known cyber security threat/attack identified through the matched signature may indeed be exploiting the current cyber security vulnerability being observed.

Moreover, in one embodiment of the invention, the RIE manager may monitor the RIE to compile a cyber vulnerability assessment (CVA). The CVA may be a report detailing the one or more known cyber security threats/attacks exploiting the current cyber security vulnerability exhibited in one or more AGIs of the set of AGIs restored in the RIE. Further, the CVA may additionally include brief information describing the known cyber security threats/attacks to which the identified PTSs match. The brief information describing the known cyber security threats/attacks may include, but is not limited to including, the geographic origins, the geographic targets, the exploited hardware and/or software components, the threat/attack types, and the impact severities associated with malicious activity induced by the known cyber security threats/attacks. Hereafter, the RIE manager may provide the generated CVA to the CSK.

In Step 442, the CSK subsequently generates a cyber protection report (CPR) based on the CVA (compiled by the RIE manager in Step 440). In one embodiment of the invention, the CPR may be a report summarizing the content (mentioned above) disclosed within the CVA. In another embodiment of the invention, the CPR may further include one or more recommendations for patching the identified cyber security vulnerabilities. Furthermore, in one embodiment of the invention, the CSK may generate a CPR for each CVA detailing just the current cyber security vulnerability. In another embodiment of the invention, the CSK may wait to generate one CPR encompassing all the CVAs detailing all of the one or more cyber security vulnerabilities that were disclosed by the RVI (received in Step 406).

In Step 444, after generating the one or more CPRs (in Step 442), the CSK forwards the CPR(s) to the API executing on the DRP. Thereafter, the API may format and/or encode the CPR(s) based on the specification for data exchange agreed upon between the DRP and the PCS, and finally, transmit the CPR(s) towards the PCS.

Figure 4D:
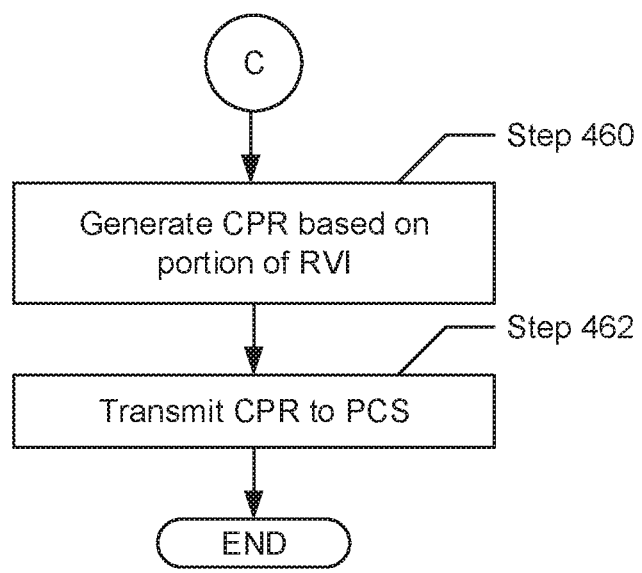

Turning to FIG. 4D, in Step 460, after determining (in Step 420) that a VRM falls short of the vulnerability risk threshold, the CSK concludes that the risk level does not warrant further investigation. Subsequently, in one embodiment of the invention, the CSK proceeds to generate a CPR based on the remaining (or other) portion of the RVI (received in Step 406) that pertains to the current cyber security vulnerability. In another embodiment of the invention, the CPR may be generated based on the remaining (or other) portion of the RVI that pertains to all of the one or more cyber security vulnerabilities disclosed by the RVI. Substantively, the CPR may be a report summarizing data and/or metadata (e.g., description, type, status, etc.) that further describes one or more cyber security vulnerabilities that one or more system hardware and/or software components identified in the EPL (compiled in Step 402) is/are known to exhibit.

In Step 462, after generating the one or more CPRs (in Step 460), the CSK forwards the CPR(s) to the API executing on the DRP. Thereafter, the API may format and/or encode the CPR(s) based on the specification for data exchange agreed upon between the DRP and the PCS, and finally, transmit the CPR(s) towards the PCS.

Figure 5:
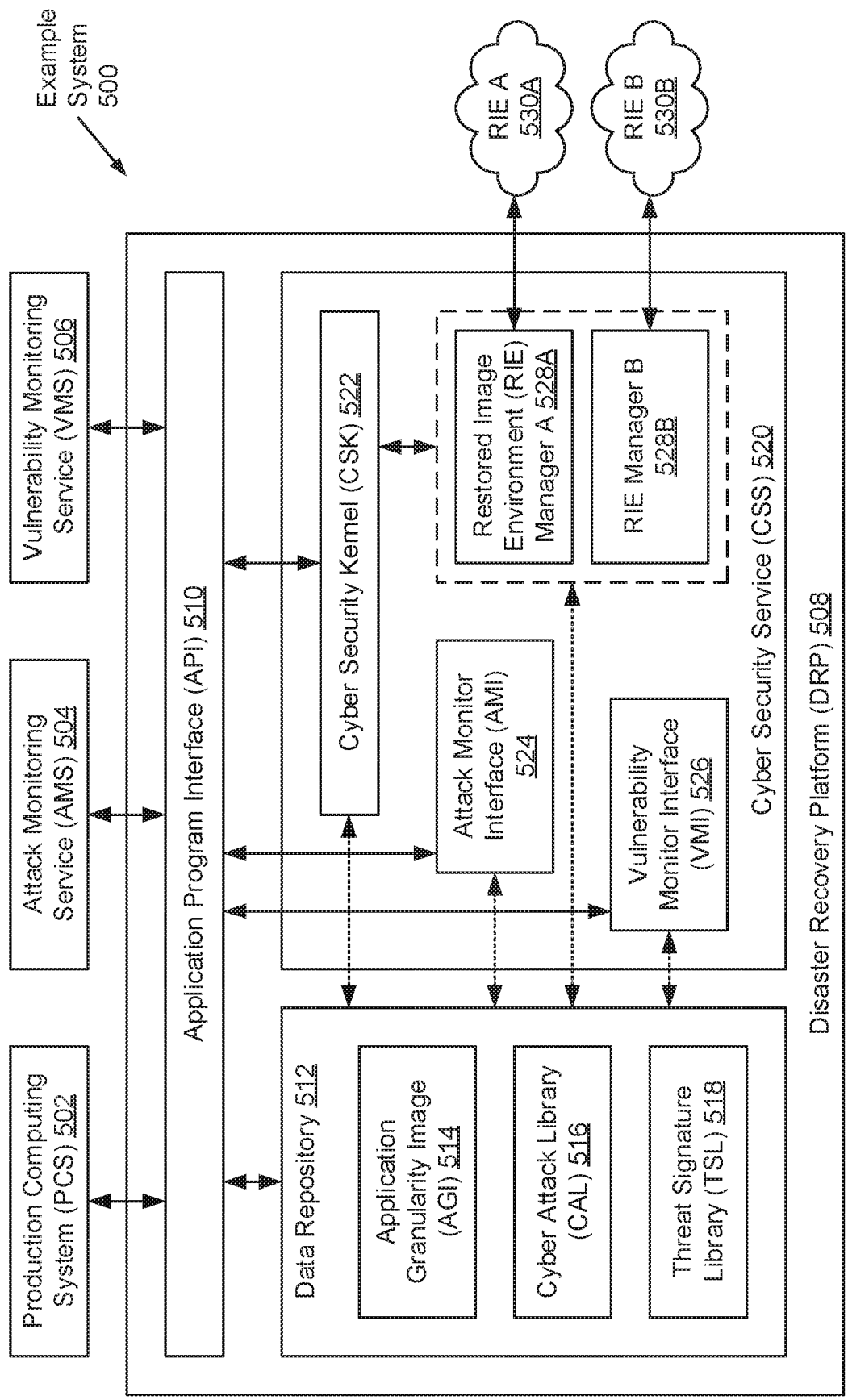
FIG. 5 shows an example system in accordance with one or more embodiments of the invention.

FIG. 5 shows an example system in accordance with one or more embodiments of the invention. The following example, presented in conjunction with components shown in FIG. 5, is for explanatory purposes only and not intended to limit the scope of the invention.

Turning to FIG. 5, the example system (500) includes an API (510) executing on a DRP (508) that is operatively connected to a PCS (502), an AMS (504), and a VMS (506). The DRP (508) further includes a data repository (512) and a CSS (520). The data repository (512) may store AGIs (514), the CAL (516), and the TSL (518). Moreover, the CSS (520) includes a CSK (522), an AMI (524), a VMI (526), and a set of RIE managers (528A, 528B) responsible for a set of RIEs (530A, 530B), respectively.

Turning to the example, consider a scenario whereby administrators of the PCS (502) have opted to enroll in using the CSS (520) feature offered by the DRP (508). That is to say, in addition to using the DRP (508) as a backup and archiving solution, the enrollment grants the testing of AGIs (514) in an isolated cloud computing environment to assess the AGIs (514) against known cyber security threats/attacks and/or to identify any cyber security vulnerabilities the AGIs (514) may exhibit. However, to the administrators of the PCS (502), the conducting of cyber security assessments in the cloud can be expensive. Consequently, the administrators further opt to take advantage of the CSS (520) offering of risk-based metrics as a decision threshold for maximizing PCS (502) cyber protection while minimizing resources expended.

Upon activation, the CSK (522) of the CSS (520) accesses the data repository (512) to select/retrieve an AGI (514) therefrom. After obtaining the AGI (514), the CSK (522) examines the AGI (514) to compile an EPL (not shown). For simplicity, assume the EPL identifies just the following software component installed on the PCS (502)—the Linux Mint 15 Olivia distribution including kernel version 3.8. Thereafter, the CSK (522) may pursue two different routes towards deciding whether to expend resources to further investigate the AGI (514).

Scenario 1—Yes to Further Investigation

Following a first sub-scenario, the CSK (522) directs the AMI (524) to issue an information request to the AMS (504). The information request specifies the above-mentioned software component (i.e., the Linux Mint 15 Olivia distribution with kernel version 3.8) identified in the EPL. Based on the information request, the AMS (504) may perform a search within its vast repository for any data and/or metadata associated with any emerging cyber security threats/attacks that are known to exploit the above-mentioned software component. At this point, assume the search performed by the AMS (504) leads to the identifying of data and/or metadata associated with a ransomware Trojan (e.g., ELF/Filecoder.A, Trojan.Linux.Ransom.A, etc.) that has been detected infiltrating various linux/unix distributions, including the above-mentioned Linux Mint 15 Olivia distribution with kernel version 3.8. With the search completed, the AMS (504) transmits an information response back to the AMI (524). The information response includes the found data and/or metadata pertaining to the aforementioned ransomware Trojan (hereinafter referred to as "the ransomware Trojan"). For the purposes of this example, assume the found data and/or metadata (hereinafter referred to as "the RAI") includes computer readable program code for implementing the ransomware Trojan, and the most common world regions where the ransomware Trojan had been detected.

In receiving the information response including the RAI from the AMS (504), the AMI (524) extracts a portion of the RAI—more specifically, the computer readable program code for implementing the ransomware Trojan—and updates the CAL (516) using that extracted RAI portion. Subsequently, the AMI (524) provides the remaining portion of the RAI (i.e., information disclosing the most common world regions where the ransomware Trojan had been detected) (hereinafter referred to as "the first risk factor") to the CSK (522). The CSK (522) then uses the first risk factor to compute an ARM to associated with the ransomware Trojan. By way of an example, the computation may entail determining that the PCS (502) has a high probability of being attacked by the ransomware Trojan because the PCS (502) resides within one of the most common world regions where the ransomware Trojan had been detected. After computing the ARM, the CSK (522) compares the ARM to an attack risk threshold (e.g., a threshold probability value) and determines the ARM exceeds the attack risk threshold.

Based on the aforementioned determination, the CSK (522) concludes that further investigation into the effect the ransomware Trojan may have on the PCS (502) is warranted. Consequently, the CSK (522) proceeds to allocate cloud environment computing resources to instantiate a RIE (530A). Thereafter, the CSK (522) allocates further cloud environment computing resources to instantiate containers tasked with emulating multiple computer processes. These computer processes implement the AGI (514) retrieved earlier, thereby restoring the AGI (514) within the RIE (530) to configure the RIE (530). Next, the CSK (522) creates a RIE manager (528A) to manage the RIE (530A) and the cyber security assessments that will follow.

Upon activation, the RIE manager (528A) accesses the CAL (516) and obtains the computer readable program code (hereinafter referred to as "the algorithm") for implementing the ransomware Trojan (stored therein earlier). From here, the RIE manager (528A) then executes the algorithm within the RIE (530A), thereby applying the ransomware Trojan to the AGI (514) restored therein. Following the execution of the algorithm, the RIE manager (528A) employs various scanning techniques to monitor the impact of the ransomware Trojan on the AGI (514), specifically noting any flaws or weaknesses in the AGI (514) particularly susceptible to the ransomware Trojan. Based on the monitoring, the RIE manager (528A) then generates a CAA (not shown) detailing the flaws/weaknesses detected in the AGI (514) and the severity of effects introduced by the ransomware Trojan on the AGI (514). The RIE manager (528A) then forwards the CAA to the CSK (522).

In receiving the CAA from the RIE manager (528A), the CSK (522) generates a CPR (not shown) summarizing the content within the CAA. The CSK (522) further appends, to the CPR, one or more recommendations for defending against the ransomware Trojan. Finally, the CSK (522) provides the CPR to the API (510), which in turn, encodes and transmits the CPR towards the PCS (502).

Scenario 2—No to Further Investigation

Following a second sub-scenario, the CSK (522) directs the VMI (526) to issue an information request to the VMS (506). The information request specifies the above-mentioned software component (i.e., the Linux Mint 15 Olivia distribution with kernel version 3.8) identified in the EPL. Based on the information request, the VMS (506) may perform a search within its vast repository for any data and/or metadata associated with any emerging cyber security vulnerabilities that are known to reside on the above-mentioned software component. At this point, assume the search performed by the VMS (506) leads to the identifying of data and/or metadata associated with a Secure Shell (SSH) utility built into the Linux Mint 15 Olivia distribution with kernel version 3.8. With the search completed, the VMS (506) transmits an information response back to the VMI (526). The information response includes the found data and/or metadata pertaining to the aforementioned SSH utility (hereinafter referred to as "the SSH"). For the purposes of this example, assume the found data and/or metadata (hereinafter referred to as "the RVI") includes a cyber security threat signature identifying a cyber security attack known to exploit the SSH, and the current status of the SSH indicating patches have since begun being distributed worldwide.

In receiving the information response including the RVI from the VMS (506), the VMI (526) extracts a portion of the RVI—more specifically, the cyber security threat signature identifying the cyber security attack known to exploit the SSH—and updates the TSL (518) using that extracted RVI portion. Subsequently, the VMI (526) provides the remaining portion of the RVI (i.e., information disclosing the current status of the SSH, which indicates patches for resolving the SSH are available) (hereinafter referred to as "the second risk factor") to the CSK (522). The CSK (522) then uses the second risk factor to compute a VRM to associated with the SSH. By way of an example, the computation may entail determining that the PCS (502) has a low probability of being susceptible to attacks targeting the SSH because patches resolving the cyber security vulnerability are widely available. After computing the VRM, the CSK (522) compares the VRM to a vulnerability risk threshold (e.g., a threshold probability value) and determines the VRM falls short of the vulnerability risk threshold.

Based on the aforementioned determination, the CSK (522) concludes that further investigation into the extent of susceptibility the PCS (502) may be due to the SSH residing thereon is not warranted. Consequently, the CSK (522) proceeds to generate a CPR based on the remaining portion of the RVI obtained from the VMI (526). The CSK (522) may further append, to the CPR, one or more uniform resource locators (URLs) where the patch for resolving the SSH are available. Finally, the CSK (522) provides the CPR to the API (510), which in turn, encodes and transmits the CPR towards the PCS (502).

Figure 6:
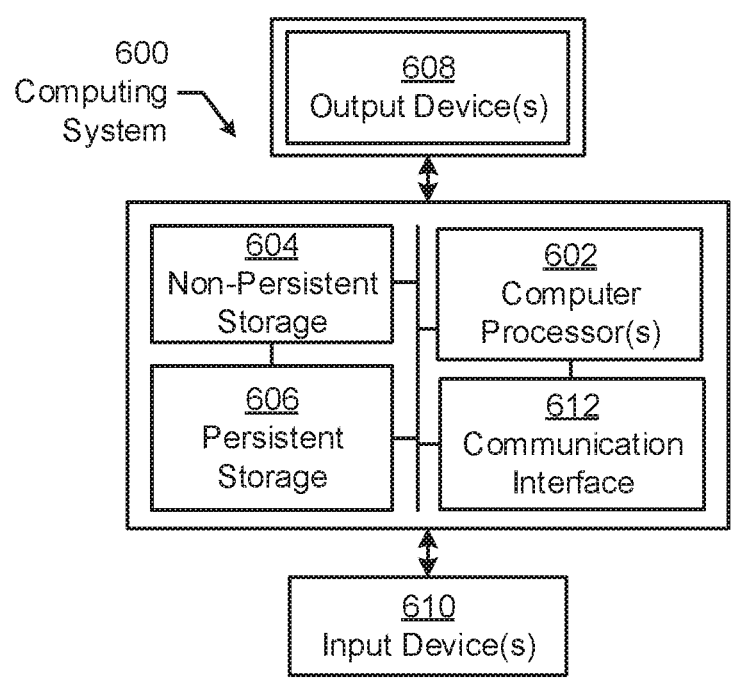
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606).

Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring cyber security risk, comprising:
    selecting a set of application granularity images (AGIs);
    compiling an environment properties list (EPL) derived from the set of AGIs;
    obtaining relevant attack information (RAI) based on the EPL;
    computing an attack risk metric (ARM) using at least a portion of the RAI;
    making a determination that the ARM exceeds an attack risk threshold;
    based on the determination:
        restoring the set of AGIs within a restored image environment (RIE), wherein the RIE is an isolated cloud computing environment, wherein the set of restored AGIs execute on the isolated cloud computing environment, wherein the isolated cloud computing environment limits access to the RIE from one or more external sources or other RIEs except for an available one or more ports through which an authorized RIE manager monitors the RIE;
        administering a known cyber security attack to the set of AGIs restored within the RIE; and
        monitoring the set of AGIs administered with the known cyber security attack to compile a cyber attack assessment (CAA).

2. The method of claim 1, wherein the set of AGIs represents one selected from a group consisting of a computer process, an application comprising a plurality of computer processes, and a plurality of applications comprising a plurality of mutually exclusive sets of computer processes.

3. The method of claim 1, wherein the EPL specifies at least one selected from a group consisting of a hardware component installed on a computing system and a software component installed on the computing system, wherein the set of AGIs is based on at least a portion of the computing system.

4. The method of claim 3, wherein the RAI specifies metadata describing at least one known cyber security attack that targets the at least one selected from the group consisting of the hardware component installed on the computing system and the software component installed on the computing system.

5. The method of claim 1, further comprising:
    obtaining relevant vulnerability information (RVI) based on the EPL; and
    computing a vulnerability risk metric (VRM) using at least a portion of the RVI.

6. The method of claim 5, wherein the RVI specifies metadata describing at least one cyber security vulnerability that is exhibited by at least one selected from a group consisting of a hardware component installed on a computing system and a software component installed on the computing system, wherein the set of AGIs is based on at least a portion of the computing system.

7. The method of claim 5, further comprising:
    determining that the VRM exceeds a vulnerability risk threshold;
    based on the determining:
        instantiating RIE;
        configuring the RIE through restoration of the set of AGIs therein;
        identifying a potential threat signature (PTS) exhibited by the set of AGIs while restored in the RIE;
        matching the PTS to a known cyber security threat signature; and
        based on the matching, compiling a cyber vulnerability assessment (CVA).

8. A system, comprising:
    a data repository; and
    a cyber security service (CSS) operatively connected to the data repository, and programmed to:
        select a set of application granularity images (AGIs) stored in the data repository;
        compile an environment properties list (EPL) derived from the set of AGIs;
        obtain relevant attack information (RAI) based on the EPL;
        compute an attack risk metric (ARM) using at least a portion of the RAI;
        make a determination that the ARM exceeds an attack risk threshold;
        based on the determination:
            restore the set of AGIs within a restored image environment (RIE), wherein the RIE is an isolated cloud computing environment, wherein the set of restored AGIs execute on the isolated cloud computing environment, wherein the isolated cloud computing environment is configured to limit access to the RIE from one or more external sources or other RIEs except for an available one or more ports through which an authorized RIE manager monitors the RIE;
            administer a known cyber security attack to the set of AGIs restored within the RIE; and
            monitor the set of AGIs administered with the known cyber security attack to compile a cyber attack assessment (CAA).

9. The system of claim 8, further comprising:
    a disaster recovery platform (DRP) comprising the data repository and the CSS.

10. The system of claim 8, further comprising:
    an attack monitoring service (AMS) operatively connected to the CSS, and programmed to:
        track intelligence on at least one latest cyber security attack; and
        share the intelligence with the CSS,
        wherein the at least one latest cyber security attack targets at least one selected from a group consisting of a hardware component and a software component, specified in the EPL.

11. The system of claim 8, further comprising:
a vulnerability monitoring service (VMS) operatively connected to the CSS, and programmed to:
track intelligence on at least one latest cyber security vulnerability; and
share the intelligence with the CSS,
wherein the at least one latest cyber security vulnerability resides on at least one selected from a group consisting of a hardware component and a software component, specified in the EPL.

12. A non-transitory computer readable medium (CRM) comprising computer readable program code, which when executed by a computer processor, enables the computer processor to:
select a set of application granularity images (AGIs);
compile an environment properties list (EPL) derived from the set of AGIs;
obtain relevant attack information (RAI) based on the EPL;
compute an attack risk metric (ARM) using at least a portion of the RAI;
make a determination that the ARM exceeds an attack risk threshold;
based on the determination:
restore the set of AGIs within a restored image environment (RIE), wherein the RIE is an isolated cloud computing environment, wherein the set of restored AGIs execute on the isolated cloud computing environment, wherein the isolated cloud computing environment limits access to the RIE from one or more external sources or other RIEs except for an available one or more ports through which an authorized RIE manager monitors the RIE;
administer a known cyber security attack to the set of AGIs restored within the RIE; and
monitor the set of AGIs administered with the known cyber security attack to compile a cyber attack assessment (CAA).

13. The non-transitory CRM of claim 12, wherein the set of AGIs represents one selected from a group consisting of a computer process, an application comprising a plurality of computer processes, and a plurality of applications comprising a plurality of mutually exclusive sets of computer processes.

14. The non-transitory CRM of claim 12, wherein the EPL specifies at least one selected from a group consisting of a hardware component installed on a computing system and a software component installed on the computing system, wherein the set of AGIs is based on at least a portion of the computing system.

15. The non-transitory CRM of claim 14, wherein the RAI specifies metadata describing at least one known cyber security attack that targets the at least one selected from the group consisting of the hardware component installed on the computing system and the software component installed on the computing system.

16. The non-transitory CRM of claim 12, further comprising computer readable program code, which when executed by the computer processor, enables the computer processor to:
obtain relevant vulnerability information (RVI) based on the EPL; and
compute a vulnerability risk metric (VRM) using at least a portion of the RVI.

17. The non-transitory CRM of claim 16, wherein the RVI specifies metadata describing at least one cyber security vulnerability that is exhibited by at least one selected from a group consisting of a hardware component installed on a computing system and a software component installed on the computing system, wherein the set of AGIs is based on at least a portion of the computing system.

18. The non-transitory CRM of claim 16, further comprising computer readable program code, which when executed by the computer processor, enables the computer processor to:
determine that the VRM exceeds a vulnerability risk threshold;
based on the determining:
instantiate RIE;
configure the RIE through restoration of the set of AGIs therein;
identify a potential threat signature (PTS) exhibited by the set of AGIs while restored in the RIE;
match the PTS to a known cyber security threat signature; and
based on the matching, compile a cyber vulnerability assessment (CVA).

* * * * *